US007012477B2

(12) United States Patent
Harron et al.

(10) Patent No.: US 7,012,477 B2
(45) Date of Patent: Mar. 14, 2006

(54) MODULATION USING DISCRETE AMPLITUDE ADJUSTMENT AND DUAL DIGITAL DELAY LINES

(75) Inventors: Gerald Harron, Martensville (CA); Jason T. Tucker, Saskatoon (CA); Surinder Kumar, Victoria (CA)

(73) Assignee: VCom Inc., Victoria (CA)

( * ) Notice: Subject to any disclaimer, the term of this patent is extended or adjusted under 35 U.S.C. 154(b) by 136 days.

(21) Appl. No.: 10/796,418

(22) Filed: Mar. 10, 2004

(65) Prior Publication Data

US 2005/0116785 A1 Jun. 2, 2005

Related U.S. Application Data

(60) Provisional application No. 60/525,118, filed on Nov. 28, 2003.

(51) Int. Cl.
*H03K 7/10* (2006.01)

(52) U.S. Cl. ...................... 332/108; 332/103; 375/298

(58) Field of Classification Search ................ 332/108, 332/103; 375/298

See application file for complete search history.

(56) References Cited

U.S. PATENT DOCUMENTS

| | | | | |
|---|---|---|---|---|
| 5,329,259 | A | 7/1994 | Stengel et al. | 332/103 |
| 5,612,651 | A | 3/1997 | Chethik | 332/103 |
| 5,659,272 | A | 8/1997 | Linquet | 332/151 |
| 5,852,389 | A | 12/1998 | Kumar et al. | 332/103 |
| 5,867,071 | A | 2/1999 | Chethik | 332/103 |
| 6,147,553 | A | 11/2000 | Kolanek | 330/10 |
| 6,160,856 | A | 12/2000 | Gershon | 375/320 |
| 6,313,703 | B1 | 11/2001 | Wright et al. | 330/149 |
| 6,366,177 | B1 | 4/2002 | McCune et al. | 332/103 |
| 2002/0051091 | A1 * | 5/2002 | Dedieu et al. | 348/723 |
| 2002/0067218 | A1 * | 6/2002 | Schenk | 332/103 |

* cited by examiner

*Primary Examiner*—Joseph Chang
(74) *Attorney, Agent, or Firm*—Adrian D. Battison; Michael R. Williams; Ryan W. Dupuis

(57) ABSTRACT

The present invention provides a means to implement amplitude and phase modulation digitally and directly at an RF frequency that benefits from high output power without the use of amplifiers. This is accomplished by the combination of two varying amplitude and phase vectors. A reference oscillator produces a carrier signal, which is supplied to two digital delay lines composed of a sequence of delay banks. The delay lines are controlled by lookup tables that are updated by the vector control circuit, used to determine the delay of each digital delay line. The output of each delay line is multiplexed to a switching bank which is also controlled by the vector control circuit. The output of the switching bank, in combination with a summer, is used to produce discrete amplitude adjustment of the vector. The delay of the lines and the summation adjustment are set in such a way as to produce two vectors with the desired phase shift and magnitude the summation of these two vectors produces a resultant vector with the desired phase and amplitude characteristics.

24 Claims, 4 Drawing Sheets

MODULATION USING DISCRETE AMPLITUDE ADJUSTMENT AND DUAL DIGITAL DELAY LINES

This application claims priority under 35 U.S.C. 119 from Provisional Application Ser. No. 60/525,118 filed Nov. 28$^{th}$, 2003.

This application is related to an application filed simultaneously with this application by the same inventors and entitled AMPLITUDE AND PHASE MODULATION USING DUAL DIGITAL DELAY VECTORS the disclosure of which is incorporated herein by reference.

FIELD OF THE INVENTION

This invention relates generally to telecommunication systems. The present invention relates more specifically to data transmission using analog signals, more specifically, to a unique method for providing amplitude and phase modulation of a signal using multiple summations of the outputs of dual digital delay lines.

BACKGROUND OF THE INVENTION

The following references may be relevant to the present invention:

U.S. Pat. No. 5,329,259 Stengel, "Efficient Amplitude/Phase Modulation Amplifier"

U.S. Pat. No. 5,612,651 Chethik, "Modulating Array QAM Transmitter"

U.S. Pat. No. 5,659,272 Linguet, "Amplitude Modulation Method and Apparatus using Two Phase Modulated Signals"

U.S. Pat. No. 5,852,389 Kumar, "Direct QAM Modulator"

U.S. Pat. No. 5,867,071 Chethik, "High Power Transmitter Employing a high Power QAM Modulator"

U.S. Pat. No. 6,147,553 Kolanek, "Amplification Using Amplitude Reconstruction of Amplitude and/or Angle Modulated Carrier"

U.S. Pat. No. 6,160,856 Gershon, "System For Providing Amplitude and Phase Modulation of Line Signals Using Delay Lines"

U.S. Pat. No. 6,313,703 B1 Wright et al., "Use of Antiphase Signals For Predistortion Training Within An Amplifier System"

U.S. Pat. No. 6,366,177 McCune, "High-Efficiency Power Modulators"

With the ever increasing demand for the high speed transfer of information digital systems are becoming more significant each day. In its simplest form the modern telecommunication system requires circuits for modulation, frequency conversion, transmission and detection.

The basis for signal transmission is a continuous time varying constant-frequency signal known as a carrier. The carrier signal can be represented as S(t)=A cos (2□ft+σ), where f is the frequency, A is the amplitude, and σ is the phase of the signal. S(t) is a deterministic signal, and alone carries no useful information. However, information could be encoded on S(t) if one or more of the following characteristics of the carrier were altered: amplitude, frequency or phase. In essence modulation is the process of encoding an information source onto a high-frequency, carrier signal S(t).

Bandpass digital systems can be divided into two main categories; binary digital systems or multilevel digital systems. Binary digital systems are limited in that they can only represent a one bit symbol (0 or 1) at any given time. The most common binary bandpass signal techniques are Amplitude Shift Keying (ASK), Phase Shift Keying (PSK), and Frequency Shift Keying (FSK). For example, a binary digital system using ASK might have a signal range from 0 to 3 Volts. Any value less than 1.5 Volts would represent a digital 0 and anything greater than 1.5 Volts would represent a digital 1. Alternatively, FSK would use two different frequencies and PSK would use two different phases to represent a digital 0 or 1. However, binary digital systems are not as practical as multilevel systems since digital transmission is notoriously wasteful of RF bandwidth, and regulatory authorities usually require a minimum bandwidth efficiency.

With multilevel digital systems, inputs with more than two modulation levels are used. In cases like this multiple bits can be sent with each symbol, increasing the speed and efficiency in which data is transmitted. In keeping with the previous example of an amplitude modulated signal with a range from 0 to 3 Volts, the signal amplitude could be broken into 4 distinct points; 0.75, 1.5, 2.25, 3V could correspond to binary 00, 01, 10 and 11 respectively. Alternatively, such transformations can be implemented by adjusting the phase or frequency of the carrier.

More advanced techniques for a multilevel digital system would include a combination of amplitude and phase modulations of a carrier signal. In this case a single multi-bit symbol could be represented by a signal with a certain phase and amplitude. Each symbol of digital data could be defined as a vector with a specified amplitude and angle and visualized on a polar axis. In one of its simplest forms a three bit digital symbol could be represented by two distinct amplitudes and four distinct phases.

There are various common modulation techniques which require the amplitude and phase adjustment of a carrier signal. Solutions to these modulation techniques are typically built in either analog or digital circuitry. One such solution is shown and described hereinafter which will be recognized by those familiar to the art as a IQ modulator. Due to its requirements for digital to analog conversion and linear power amplification before transmission, modulators of this form typically consume lots of power.

SUMMARY OF THE INVENTION

It is one object of the present invention to provide an apparatus for amplitude and phase modulation of a signal.

According to the invention there is provided an apparatus for amplitude and phase modulation of a signal comprising:

a reference pulse oscillator arranged to provide a signal in the form of a series of input pulses;

an input for input modulating data including desired amplitude and phase modulation;

a vector logic circuit responsive to the input modulating data;

two digital delay lines each coupled to said reference oscillator and having multiple delay cells for selectively delaying respective pulses of said signal;

two lookup tables each of which contains information for controlling the delay cells of a respective one of the delay lines so that the vector logic circuit controls an overall delay of the respective one of the digital delay lines using the information so as to generate therefrom a component vector which is dependent upon the input modulating data;

two amplitude adjustment circuits each of which contains a switching bank and combiner that enables the summation of input signals from a respective one of the digital delay lines to produce amplitude variances in output vectors therefrom;

and a summer that is coupled to the two amplitude adjustment circuits which combines the output vectors therefrom together.

Preferably said vector logic circuit utilizes the desired magnitude and phase data to determine the required phase and magnitude of the two component vectors.

Preferably the component vectors have the same magnitude and will be equidistant, radially, from the resultant vector.

Preferably the formula $\cos^{-1}[r/(2V)]$ governs the component vectors angle of rotation away from the desired output phase. In the governing formula r represents the desired output magnitude and V is the magnitude of the component vectors.

Preferably said vector logic circuit compensates for the special cases where the phase of the leading or trailing vectors cross the 360° barrier.

Preferably said vector logic circuit converts the phase information into an equivalent delay.

Preferably said vector logic circuit updates lookup tables with the information required to reproduce the required delay.

Preferably said vector logic circuit determines the minimum allowable amplitude of the component vectors required to reproduce the desired resultant vector.

Preferably the minimum allowable amplitude must be larger than or equal to r/2.

Preferably said delay lines contain a finite number of sequential or parallel delay cells capable of covering 360° of phase with the desired resolution.

Preferably said delay cells have equivalent or weighted delay periods.

Preferably said delay cells contain a feedback edge detector, where upon detection of a falling edge the delay cell confirms its next status from a lookup table.

Preferably said digital delay lines contain a finite number of extra delay cells which can be used for compensation for the time resolution steps.

Preferably said lookup tables contain the delay information required to reproduce a specified phase.

Preferably said tables are directly referenced by the digital delay lines in order to control which delay cells are enabled at a given time.

Preferably said tables contain redundant registers which allow for compensation information.

Preferably said amplitude adjustment circuits provide finite discrete amplitude adjustment to a phase varying signal.

Preferably said amplitude adjustment circuits performs the discrete amplitude adjustment by the summation of multiple in phase vectors exiting the digital delay line.

Preferably said amplitude adjustment circuits are controlled by the vector logic circuit.

Preferably each discrete magnitude step is twice the magnitude of the last increment.

Preferably said summer is coupled to the two amplitude adjustment circuits for the purpose of combining two variable phase and amplitude component vectors into a resultant vector containing a desired amplitude and phase.

Preferably said reference pulses are a high power pulse train, with the pulses being at least as large as the desired output power of the modulated signal.

The invention may provide one or more of the following advantages:

Digital data is converted into an analog signal without the use of digital to analog converters.

Digital data is converted into a high power modulated signal without the use of amplification before transmission.

It removes all digital to analog converters (DACs) from the modulation process. Another advantage is it also provides a novel method for amplitude and phase modulation which does not require post modulation amplification. Removal of the DACs and amplifier results in a significant power reduction compared to the conventional techniques.

The previously stated advantages are achieved, in part, by providing an amplitude and phase modulated system that produces two high power variable amplitude phase modulated vectors that, when summed together, will produce the desired amplitude and phase-modulated signal. In order to facilitate this action, a high power input reference pulse is fed into two digital delay lines (DDL) containing a specified number (N) of delay blocks. Unlike typical IQ modulator techniques, the reference signal, that is fed to the DDLs, does not have to be scaled back to maintain linearity. Each delay line is controlled by a lookup table, which contains the required delay to shift the input reference pulse to the desired phase. The phase of the two vectors are chosen by the vector logic block. The vector logic block updates the lookup tables for each delay line, thus establishing the phase of each vector. In addition the vector logic block controls switching banks which enable the summation of multiple outputs from the delay lines to produce discrete amplitude adjustments. The phase and amplitudes of the vectors are chosen in such a way that when summed together they produce a resulting vector that contains both the desired phase and amplitude modulation.

Although the invention has general application in the field of signal modulation, the most direct use of the method described in the invention is the realization of a transmitter that converts digital data into an amplitude and phase modulated signal to be transmitted over a communications line. In this case, the vector produced by the invention represents a binary symbol. The number of bits in the symbol are determined by the encoding technique implemented.

DETAILED DESCRIPTION

Figure 1:
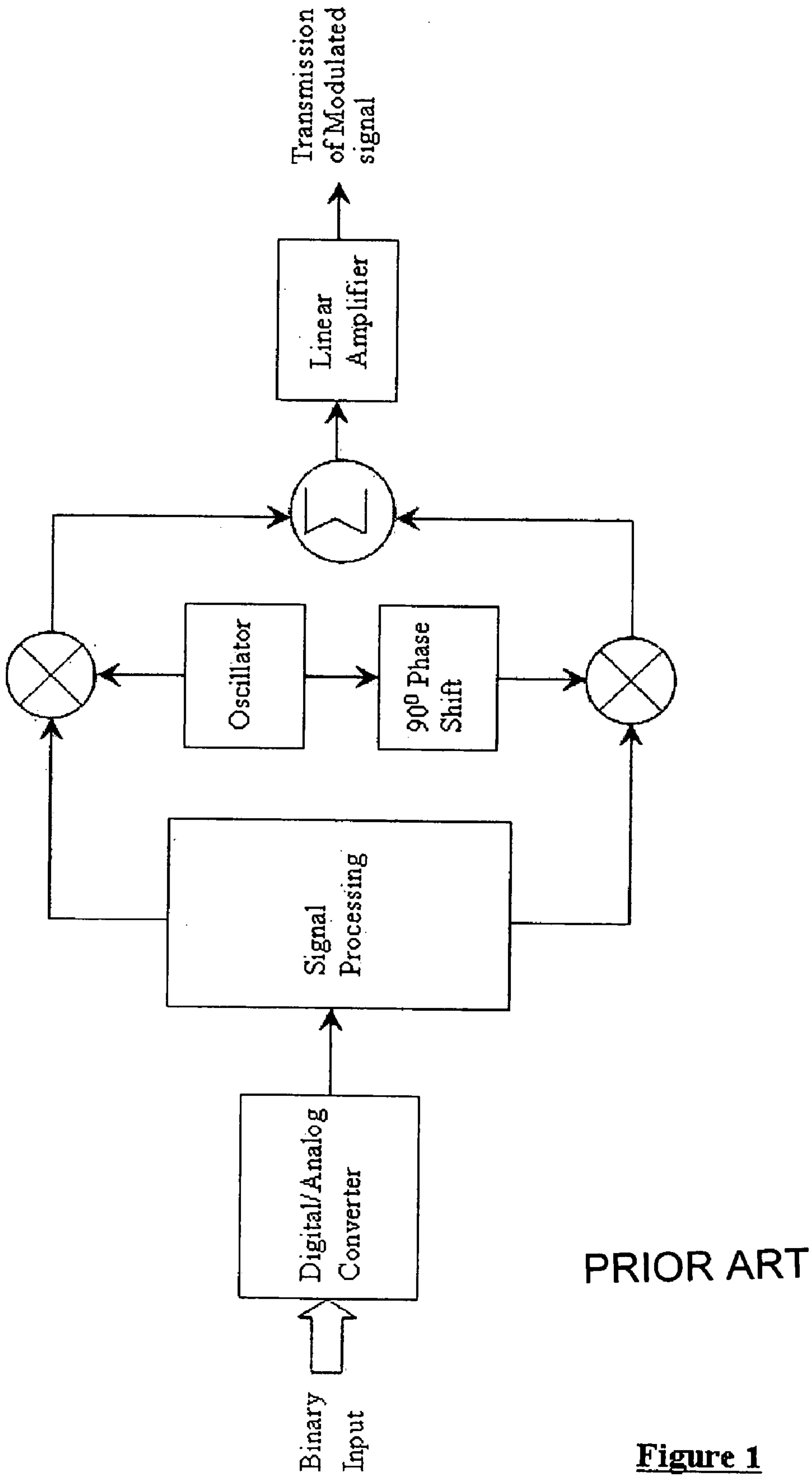
FIG. 1 is a schematic block diagram of a prior art of IQ modulator.
Figure 2:
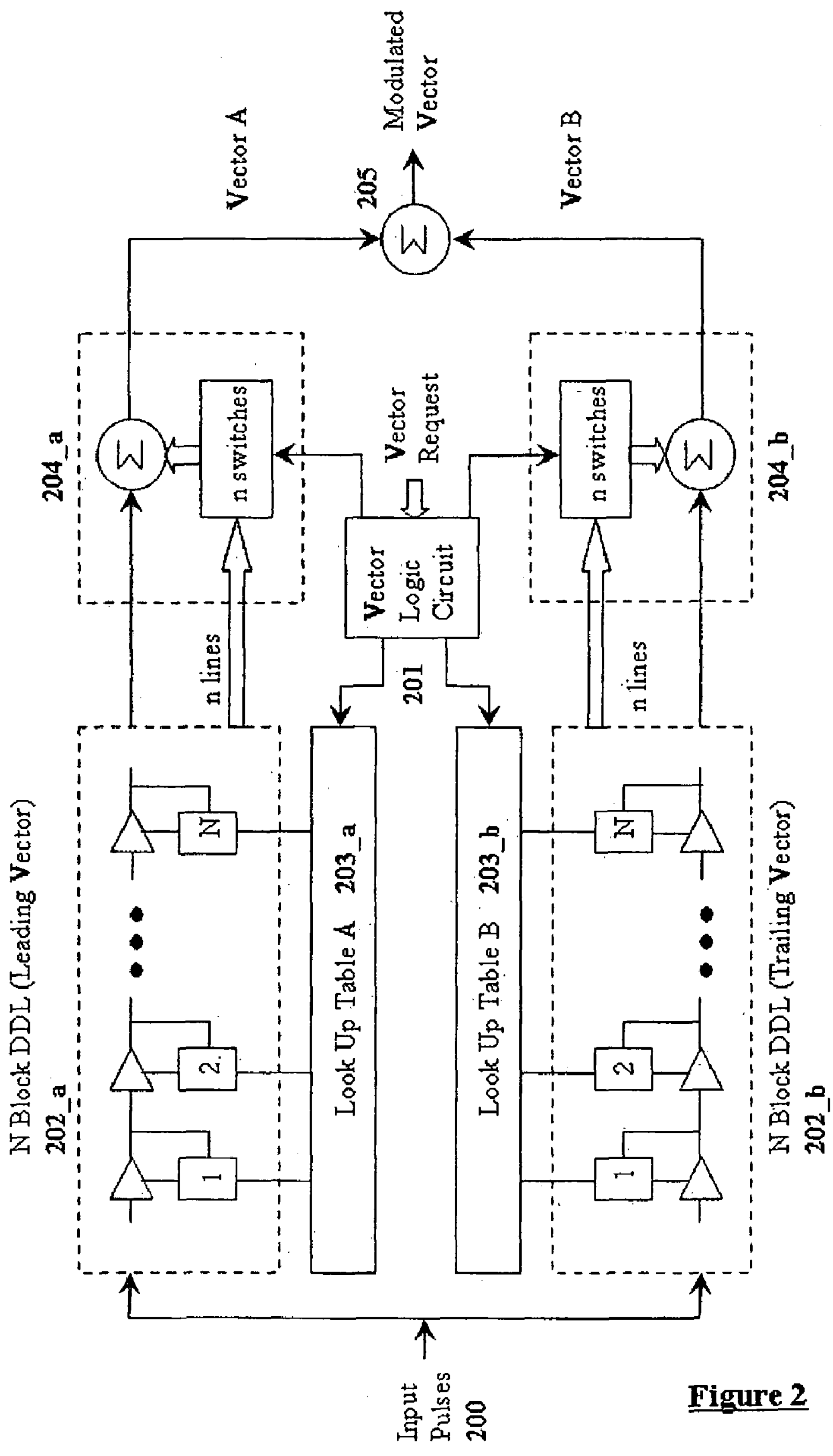
FIG. 2 is a schematic block diagram of one embodiment of an apparatus according to the present invention.

This invention synthesizes a vector with the desired amplitude and phase using two vectors that have dynamically controlled phases and discretely controlled magnitudes. FIG. 2 illustrates a block diagram of the invention. The invention consists of six major blocks; input pulses 200, a vector logic circuit 201, two digital delay lines 202, two lookup tables 203, two discrete amplitude control circuits 204, and a signal combiner 205.

The vector logic circuit 201 is supplied with digital data corresponding to the desired magnitude and phase of the output vector. Once the data has been received the logic circuit determines the phase and magnitude of the two vectors needed to generate the desired output vector. The vector logic circuit 201 determines the phase of each vector by using the following assumptions:

Both vectors will have the same magnitude.

Each vector will be equidistant, radially, from the resultant vector.

Figure 3:
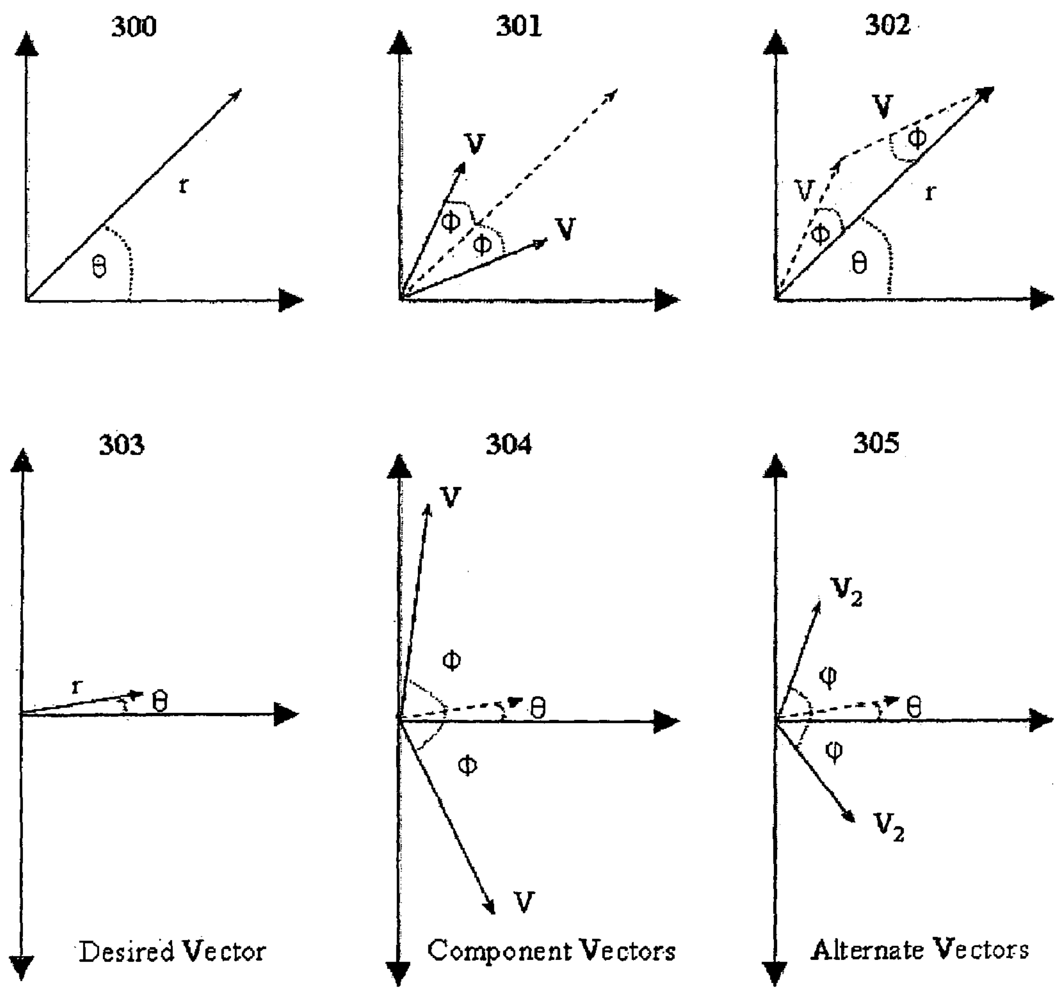
FIG. 3 is a graphical representation of the vector math for the embodiment of FIG. 2.

Having defined the vectors in the above manner the vector logic circuit 201 can determine the phase of each vector. If the desired output vector 300 has a magnitude r and phase □ the required angle of rotation away from □ would be equal to □=$Cos^{-1}$[r/(2V)], where V is the magnitude of the each vector 301. The absolute phase of the leading vector would be □+□, while the absolute phase of the trailing vector would be □−□. Special consideration must be taken when the leading or trailing vector crosses over the 2□ or 360° barrier. In such cases 2□ is either added to, or subtracted from, the absolute phase of the vector depending upon whether it is the leading or trailing vector that has crossed the bound. FIG. 3 shows a graphical example of the vector math.

In cases where the desired modulated vector 303 has a significantly smaller magnitude than the component vectors 304 the required offset phase □ becomes quite large. As □ approaches 90° the delay lines 202 require greater accuracy and resolution control in order to achieve the required resultant magnitude. In cases like this any deviation in phase would result in significant error in the amplitude modulation. In order to minimize the phase resolution requirements it is advantageous to reduce the magnitude of the component vectors 305. The vector logic circuit 201 determines the minimum amplitude for the component vectors to reproduce the desired amplitude modulation. In order to achieve the desired resultant the minimum amplitude of each component vector must be larger than or equal to r/2. Once the vector magnitude is determined the new angular rotation 305 away from the required phase becomes ϕ. The amplitude control is achieved by implementing a finite number of discrete magnitude steps. The preferred implementation is to have each discrete magnitude step set to be twice the magnitude of the last increment. This can be seen graphically in 304 and 305. The component vectors in 304 having magnitude V require a large angle □ to produce the desired amplitude modulation. Halving the magnitude of V produces two new component vectors which have the magnitude of $v_2$ and offset angle ϕ. The relationship between offset □ and ϕ is Cos(ϕ)=2 Cos(□). Both sets of component vectors will produce the same resultant vector, but the vectors with the magnitude $v_2$ will require a significantly smaller offset angle. The vector logic circuit 201 chooses the discrete magnitude step which is closest to being larger than or equal to r/2.

Figure 4:
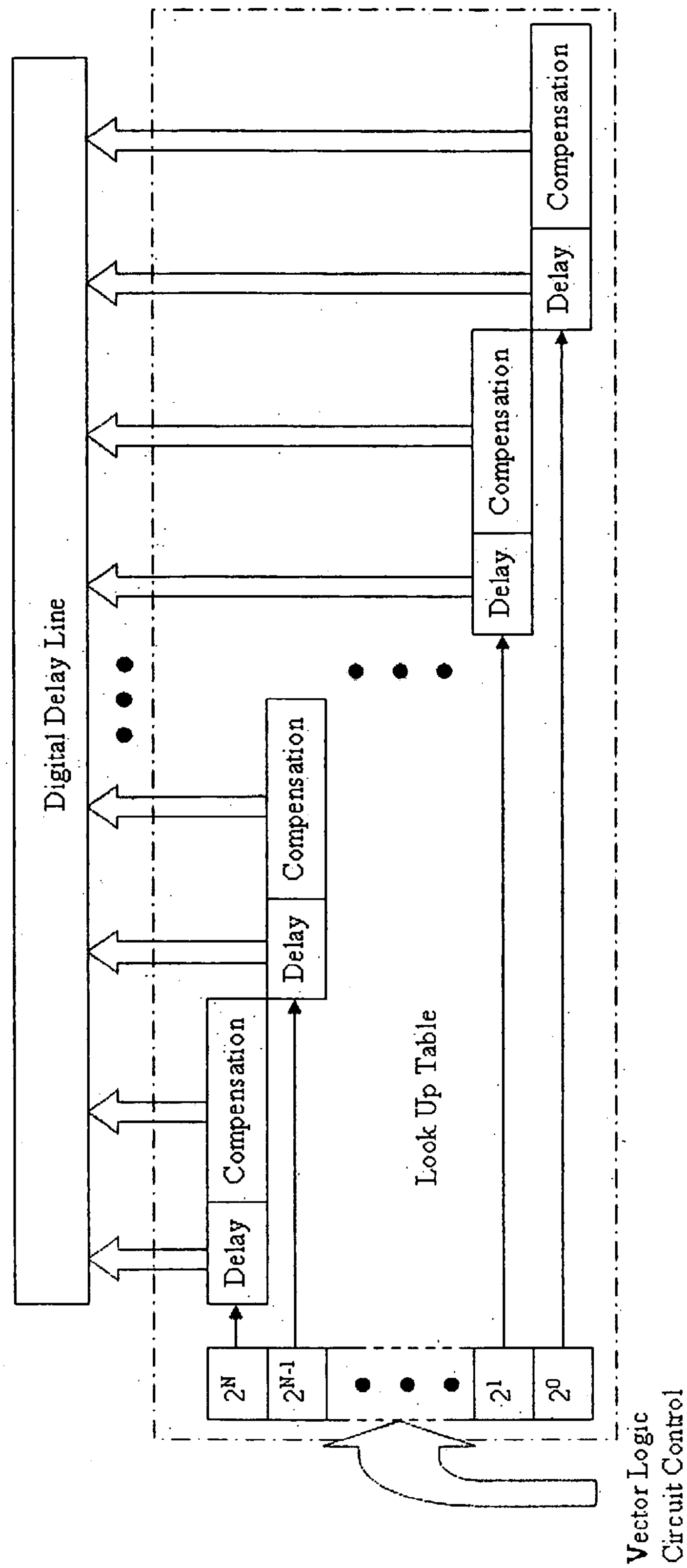
FIG. 4 is a block diagram of the lookup table for the embodiment of FIG. 2.

Once the phase of both vectors required to reproduce the desired output magnitude and phase is determined, the vector logic circuit 201 converts the phase to a required delay time and updates the lookup tables 203. Each table is used to select the delay cells required by the digital delay lines 202 to synthesize the desired phase. The tables must be updated no less than twice the speed of the symbol rate. Lookup table 203*a* contains the delay information for the vector A, while 203*b* contains the information for vector B. The preferred implementation of the invention also includes redundant blocks in each table to allow for compensation of the digital delay lines 202. The compensation takes on a form shown in FIG. 4, wherein a N bit binary number controls $2^N$ registers containing both the delay and compensation information. The compensation ensures that both digital delay lines 202 have equivalent phase coverage over 360°.

In order to produce the necessary vectors, the digital delay lines 202 require a reference signal. As amplitude compression is not an issue, the reference can be a high power signal. The power of the signal should at least be as large as the desired output power of the modulated signal. This high power pulse train 200, at the carrier frequency, is supplied to both delay lines. The digital delay lines 202 consist of a finite number (N) of sequential fixed delay cells. The delay of each cell may be equivalent or weighted. Even thought the preferred actualization of the invention is to utilize fixed equivalent sequential cells, it could also be implemented using (N) weighted parallel delay cells. The number and weight of the delay cells determine the resolution of the synthesized phase. N should be chosen to realize 360° coverage with the desired resolution. The preferred realization of the invention would also include a finite number of extra delay cells which can be used for compensation for the time resolution steps.

An example of the delay cell implementation is to use an inverter and an edge feedback detector which delays the input pulse a known amount Delta T. A delayed signal from an output of each delay cell is supplied to the input of the next delay cell. The delay of the digital delay line 202 is set in such a way as to produce the desired phase for the vector. This is accomplished by enabling or disabling specified delay cells in the delay line. The status of each delay cell is set by the lookup table 203. As the delay cell encounters a falling edge it confirms its status with the table and has half a pulse cycle to update its status if required. The signal exiting the last delay cell is multiplexed onto x lines which exit the digital delay line 202 and enter the amplitude adjustment circuit 204.

Having already determined the necessary magnitude of both vectors required to reproduce the desired output magnitude, the vector logic circuit 201 is used to control the amplitude of the component vectors via the amplitude adjustment circuit 204. Amplitude adjustment is accomplished by the summation of the multiplexed in phase vectors exiting the digital delay line 202. The x multiplexed lines enter the amplitude adjustment circuit 204 where one signal is directed to a combiner and the remaining x−1 lines enter a switching bank. The switching bank, which is controlled by the vector logic circuit 201, enables any number of the x−1 signals to be combined with the lone vector. It is the combination of these signals which produces the discrete amplitude adjustment of the component vector. Each added bit of amplitude control improves the SNR by 6 dB.

The pulses exiting 204*a* will have the phase and amplitude that the vector logic circuit 201 deemed necessary for vector A, while the pulses exiting 204*b* have the phase and magnitude deemed necessary for vector B. The pulses then enter the summer 205, which combines both vectors 302. The resulting vector will has the phase and amplitude corresponding to the desired modulation.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. An apparatus for amplitude and phase modulation of a signal comprising:

a reference pulse oscillator arranged to provide a signal in the form of a series of input pulses;

an input for input modulating data including desired amplitude and phase modulation;

a vector logic circuit responsive to the input modulating data;

two digital delay lines each coupled to said reference oscillator and having multiple delay cells for selectively delaying respective pulses of said signal;

two lookup tables each of which contains information for controlling the delay cells of a respective one of the delay lines so that the vector logic circuit controls an overall delay of the respective one of the digital delay lines using the information so as to generate therefrom a component vector which is dependent upon the input modulating data;

two amplitude adjustment circuits each of which contains a switching bank and combiner that enables the summation of input signals from a respective one of the digital delay lines to produce amplitude variances in output vectors therefrom;

and a summer that is coupled to the two amplitude adjustment circuits which combines the output vectors therefrom together.

2. The apparatus according to claim 1 wherein said vector logic circuit is arranged to utilize the desired magnitude and phase data to determine the required phase and magnitude of the two component vectors.

3. The apparatus according to claim 2 wherein the vector logic circuit is arranged such that the formula $\mathrm{Cos}^{-1}[r/(2V)]$ governs the component vectors angle of rotation away from the desired output phase where, in the governing formula, r represents the desired output magnitude and V is the magnitude of the component vectors.

4. The apparatus according to claim 2 wherein the vector logic circuit is arranged such that the component vectors have the same magnitude and are equidistant, radially, from the resultant vector.

5. The apparatus according to claim 2 wherein said vector logic circuit is arranged to compensate for the special cases where the phase of the leading or trailing vectors cross the 360° barrier.

6. The apparatus according to claim 2 wherein said vector logic circuit is arranged to convert the phase information into an equivalent delay.

7. The apparatus according to claim 2 wherein said vector logic circuit is arranged to update lookup tables with the information required to reproduce the required delay.

8. The apparatus according to claim 2 wherein said vector logic circuit is arranged to determine the minimum allowable amplitude of the component vectors required to reproduce the desired resultant vector.

9. The apparatus according to claim 8 wherein the vector logic circuit is arranged such that the minimum allowable amplitude is larger than or equal to r/2.

10. The apparatus according to claim 1 wherein each of said delay lines contains a finite number of sequential or parallel delay cells capable of covering 360° of phase with the desired resolution.

11. The apparatus according to claim 9 wherein each of said delay cells has equivalent or weighted delay periods.

12. The apparatus according to claim 10 wherein each of said delay cells contains a feedback edge detector where, upon detection of a falling edge, the delay cell confirms its next status from a lookup table.

13. The apparatus according to claim 1 wherein each of said digital delay lines contains a finite number of extra delay cells which can be used for compensation for the time resolution steps.

14. The apparatus according to claim 1 wherein each of said lookup tables contains the delay information required to reproduce a specified phase.

15. The apparatus according to claim 14 wherein each of said lookup tables is arranged such that it is directly referenced by the digital delay lines in order to control which delay cells are enabled at a given time.

16. The apparatus according to claim 13 wherein each of said lookup tables contains redundant registers which allow for compensation information.

17. The apparatus according to claim 1 wherein each of said amplitude adjustment circuits is arranged to provide finite discrete amplitude adjustment to a phase varying signal.

18. The apparatus according to claim 17 wherein each of said amplitude adjustment circuits is arranged to perform the discrete amplitude adjustment by the summation of multiple in phase vectors exiting the digital delay line.

19. The apparatus according to claim 17 wherein each of said amplitude adjustment circuits is controlled by the vector logic circuit.

20. The apparatus according to claim 17 wherein each of said amplitude adjustment circuits is arranged such that each discrete magnitude step is twice the magnitude of the last increment.

21. The apparatus according to claim 1 wherein said summer is coupled to the two amplitude adjustment circuits for the purpose of combining two variable phase and amplitude component vectors into a resultant vector containing a desired amplitude and phase.

22. The apparatus according to claim 1 wherein said reference pulses are a high power pulse train, with the pulses being at least as large as the desired output power of the modulated signal.

23. The apparatus according to claim 1 in which the input for said input modulating data is digital such that digital data is converted into the output vector which is an analog signal, without the use of digital to analog converters.

24. The apparatus according to claim 1 in which the input for said input modulating data is digital such that digital data is converted into the output vector which is an analog signal, and wherein the output vector is transmitted with minimal amplification.

* * * * *